(12) United States Patent
Birch et al.

(10) Patent No.: US 11,886,531 B2
(45) Date of Patent: Jan. 30, 2024

(54) PRESENTING INDICATORS ASSOCIATED WITH NETWORK-ASSOCIATED CONTENT

(71) Applicant: Google LLC, Mountain View, CA (US)

(72) Inventors: Samuel L. Birch, Seattle, WA (US); Yusuf Ozuysal, Palo Alto, CA (US); Christopher Lee, San Francisco, CA (US); Mei Liang, San Jose, CA (US); Wei-Yin Chen, Milpitas, CA (US); Yue Zhang, Sunnyvale, CA (US); Ayman Almadhoun, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 57 days.

(21) Appl. No.: 17/247,923

(22) Filed: Dec. 30, 2020

(65) Prior Publication Data

US 2021/0200832 A1    Jul. 1, 2021

Related U.S. Application Data

(60) Provisional application No. 62/972,411, filed on Feb. 10, 2020, provisional application No. 62/955,782, filed on Dec. 31, 2019.

(51) Int. Cl.
*G06F 3/048* (2013.01)
*G06F 16/957* (2019.01)
(Continued)

(52) U.S. Cl.
CPC ...... *G06F 16/9577* (2019.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS 8,341,519 B1\* 12/2012 Warr ..................... G06F 3/0483
715/764
9,377,929 B1    6/2016 Shrivastava
(Continued)

OTHER PUBLICATIONS

International Search Report and Written Opinion for PCT Application No. PCT/US2020/067639, dated Apr. 15, 2021, 12 pages.

*Primary Examiner* — Thanh T Vu
(74) *Attorney, Agent, or Firm* — Brake Hughes Bellermann LLP

(57) ABSTRACT

A computing device can present, within a display, first network-associated content and a tab strip, the first network-associated content being associated with a first content locator, the tab strip including a first content indicator associated with the first content locator and a second content indicator associated with a second content locator, receive a directional input associated with the tab strip, in response to receiving the directional input, modify the presentation of the tab strip, the modification ending presentation of the first content indicator and initiating presentation of a third content indicator, the third content indicator being associated with a third content locator, receive a selection of the third content indicator, and in response to receiving the selection of the third content indicator, present second network-associated content at a location where the first network-associated content was previously presented, the second network-associated content being associated with the third content locator.

25 Claims, 14 Drawing Sheets

(51) Int. Cl.
*G06F 16/958* (2019.01)
*G06F 3/04817* (2022.01)
*G06F 3/04847* (2022.01)
*G06F 3/04842* (2022.01)
*G06F 3/04883* (2022.01)

(52) U.S. Cl.
CPC ...... *G06F 3/04847* (2013.01); *G06F 3/04883* (2013.01); *G06F 16/958* (2019.01)

(56) References Cited

U.S. PATENT DOCUMENTS

| | | | |
|---|---|---|---|
| 9,942,519 B1* | 4/2018 | Pan | H04N 21/47 |
| 2006/0230356 A1* | 10/2006 | Sauve | G06F 3/0481 |
| | | | 715/777 |
| 2013/0061159 A1 | 3/2013 | Tseng et al. | |
| 2015/0346929 A1* | 12/2015 | Karunamuni | G06F 3/0488 |
| | | | 715/777 |

* cited by examiner

PRESENTING INDICATORS ASSOCIATED WITH NETWORK-ASSOCIATED CONTENT

CROSS-REFERENCE TO RELATED APPLICATIONS

This application claims priority to U.S. Provisional Patent Application No. 62/955,782, filed on Dec. 31, 2019, entitled, "TAB STRIP WITH INDICATORS ASSOCIATED WITH NETWORK-ASSOCIATED CONTENT," and U.S. Provisional Patent Application No. 62/972,411, filed on Feb. 10, 2020, entitled, "PRESENTING INDICATORS ASSOCIATED WITH NETWORK-ASSOCIATED CONTENT," the disclosures of both of which are incorporated by reference herein in their entirety.

BACKGROUND

Web browsers can render webpages downloaded from websites on the World Wide Web ("Web"). Users can navigate to different websites via a web browser.

While navigating the Web via a browser, a user can create multiple tabs in the browser. Each tab can be associated with a previously-visited webpage, and can enable the user to return to the associated webpage.

SUMMARY

A computing device can include a tab strip that presents multiple page icons and/or content indicators. The multiple page icons, which can be considered tabs included in the tab strip, can be associated with previously-visited webpages. A user can select one of the page icons to return to the associated webpage. The computing device can modify the presentation of the tab strip, such as by causing the page icons of the tab strip to move to the right or left, to end and/or terminate presentation of one or more page icons, and initiate presentation of one or more page icons that were not previously presented on a display of the computing device.

According to an example, a non-transitory computer-readable storage medium can comprise instructions stored thereon. When executed by at least one processor, the instructions can be configured to cause a computing device to present, within a display of the computing device, first network-associated content and a tab strip, the first network-associated content being associated with a first content locator, the tab strip including a first content indicator associated with the first content locator and a second content indicator associated with a second content locator, receive a directional input associated with a portion of the display presenting the tab strip, in response to receiving the directional input, modify the presentation of the tab strip, the modification ending presentation of the first content indicator and initiating presentation of a third content indicator, the third content indicator being associated with a third content locator, receive a selection of the third content indicator, and in response to receiving the selection of the third content indicator, present second network-associated content at a location where the first network-associated content was previously presented, the second network-associated content being associated with the third content locator.

According to an example, a computing device can comprise at least one processor, and a non-transitory computer-readable storage medium comprising instructions stored thereon. When executed by at least one processor, the instructions can be configured to cause the computing device to present, within a display of the computing device, first network-associated content and a tab strip, the first network-associated content being associated with a first content locator, the tab strip including a first content indicator associated with the first content locator and a second content indicator associated with a second content locator, receive a directional input associated with a portion of the display presenting the tab strip, in response to receiving the directional input, modify the presentation of the tab strip, the modification ending presentation of the first content indicator and initiating presentation of a third content indicator, the third content indicator being associated with a third content locator, receive a selection of the third content indicator, and in response to receiving the selection of the third indicator, present second network-associated content at a location where the first network-associated content was previously presented, the second network-associated content being associated with the third content locator.

According to an example, a method can comprise presenting, within a display of a computing device, first network-associated content and a tab strip, the first network-associated content being associated with a first content locator, the tab strip including a first content indicator associated with the first content locator and a second content indicator associated with a second content locator, receiving a directional input associated with a portion of the display presenting the tab strip, in response to receiving the directional input, modifying the presentation of the tab strip, the modification ending presentation of the first content indicator and initiating presentation of a third content indicator, the third content indicator being associated with a third content locator, receiving a selection of the third content indicator, and in response to receiving the selection of the third indicator, presenting second network-associated content where the first network-associated content was previously presented, the second network-associated content being associated with the third content locator.

The details of one or more implementations are set forth in the accompa-nying drawings and the description below. Other features will be apparent from the description and drawings, and from the claims.

DETAILED DESCRIPTION

A technical problem with computing devices, including mobile computing devices, is that the displays of mobile computing devices have limited areas, i.e. limited sizes and/or resolutions to display content and information to a user. In the context of tabs for browsers, a technical problem with mobile computing devices is that a limited number of tabs can be presented in the limited area of the display while still maintaining sizes for icons that a user can associate with the webpages represented by the icons. At least one, technical solution to this technical problem is to present a tab strip in the display that can change which icons are presented in response to user input. A user can, for example, provide a sliding input to cause the icons to move to the left or right, with some icons moving off of the tab strip and no longer being visible and some icons moving onto the tab strip and becoming visible. At least one, technical benefit of the tab strip that changes which icons are presented is to be able to maintain a high number of tabs and present the tabs within the limited area of the display in response to user input.

Figure 1A:
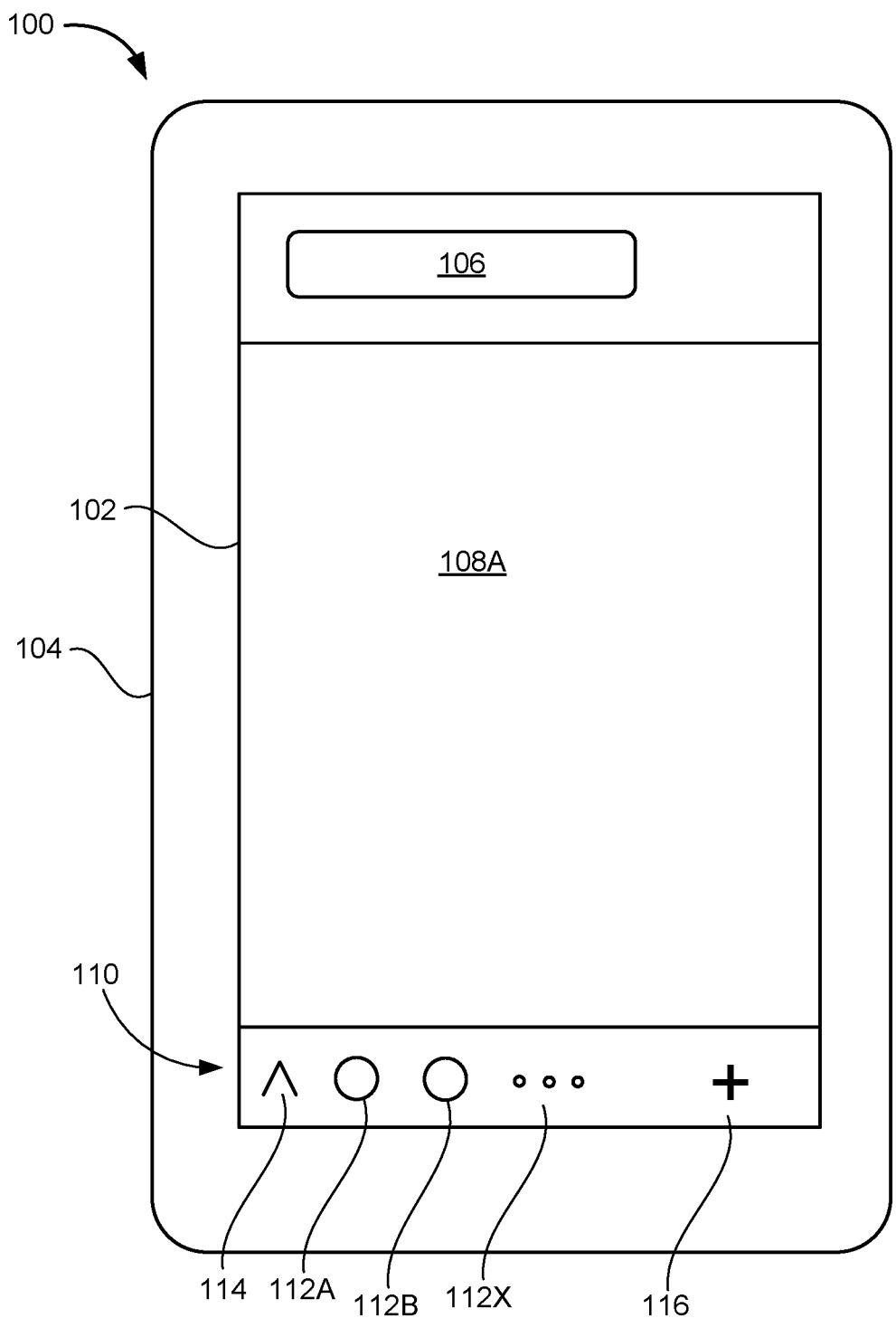
FIG. 1A shows a mobile computing device with a display presenting a first webpage and a tab strip.

FIG. 1A shows a mobile computing device 100 with a display 102 presenting a first webpage 108A and a tab strip 110. The mobile computing device 100 can include, for example, a cellphone, a smartphone, tablet, or a phablet, as non-limiting examples. The display 102 can be surrounded by a bezel 104. The bezel 104 can support or can be coupled to the display 102.

The display 102 can include a touchscreen. The touchscreen can receive and/or process a touch input, such as a touch input from a finger of a user. The touchscreen can receive and/or process the touch input based on changes in resistance (resistive touchscreen) and/or changes in capacitance (capacitive touchscreen) at locations on the display, as non-limiting examples.

The display 102 can present a Universal Resource Locator (URL) field 106. A user can enter a URL identifying a website that the user desires to visit, and the display 102 can render and/or present a webpage identified by the URL. The URL field 106 can also present the URL associated with a webpage 108A presented by the display 102. URLs are examples of content locators. Although many implementations are discussed in the context of a URL herein, other types of internet address locators or indicators can be used to identify locations or addresses of content and/or documents within the internet in connection with any of the implementations described herein. Also, although many implementations are discussed in the context of a website or webpage herein, other types of content other than a website or webpage can be used in connection with any of the implementations described herein.

The display 102 can present a webpage, such as a first webpage 108A. The webpages 108A, 108B described herein are examples of network-associated content. The webpage 108A can include content, such as text, images or pictures, and/or hyperlinks, as non-limiting examples. The mobile computing device 100 can render the content based on data, such as Hypertext Markup Language (HTML) code, received from the website identified in the URL field 106. Although many implementations are discussed in the context of HTML code, other types of content or website code can be implemented in connection with any of the implementations described herein.

The display 102 can present a tab strip 110. While FIG. 1A shows the tab strip 110 in a bottom portion of the display 102, the tab strip 110 can be located in any portion of the display 102, such as a top portion of the display, a middle portion of the display, a right portion of the display, or a left portion of the display. The tab strip 110 can present multiple page (or location) icons 112A, 112B associated with websites (or other content). The page icons 112A, 112B, 112C described herein are examples of page indicators and/or content indicators. In the example shown in FIG. 1A, the tab strip 110 presents a first page icon 112A associated with a first website and a second page icon 112B associated with a second web site. The ellipses 112X can represent additional page icons presented by the tab strip 110, with the additional page icons each being associated with another website. The first website associated with the first page icon 112A can be identified by the URL presented in the URL field 106, and/or can provide the code for rendering the first webpage 108A presented by the display 102. The page icons 112A, 112B presented in the tab strip 110 can be based on icons and/or images received from websites associated with the page icons, and/or can include reduced versions of images included in the webpages with which the page icons 112A, 112B are associated.

The page icons 112A, 112B presented by the tab strip 110 (as well as additional page icon(s) 112C shown and described below) can represent URLs within a single group. A group can include multiple URLs. The multiple URLs within the group can identify websites that a user may visit and/or may wish to revisit at proximal times. The URLs can be added to the group manually by a user, or automatically by the mobile computing device 100 based on navigation patterns by the user, as described below with respect to FIG. 4.

Figure 3:
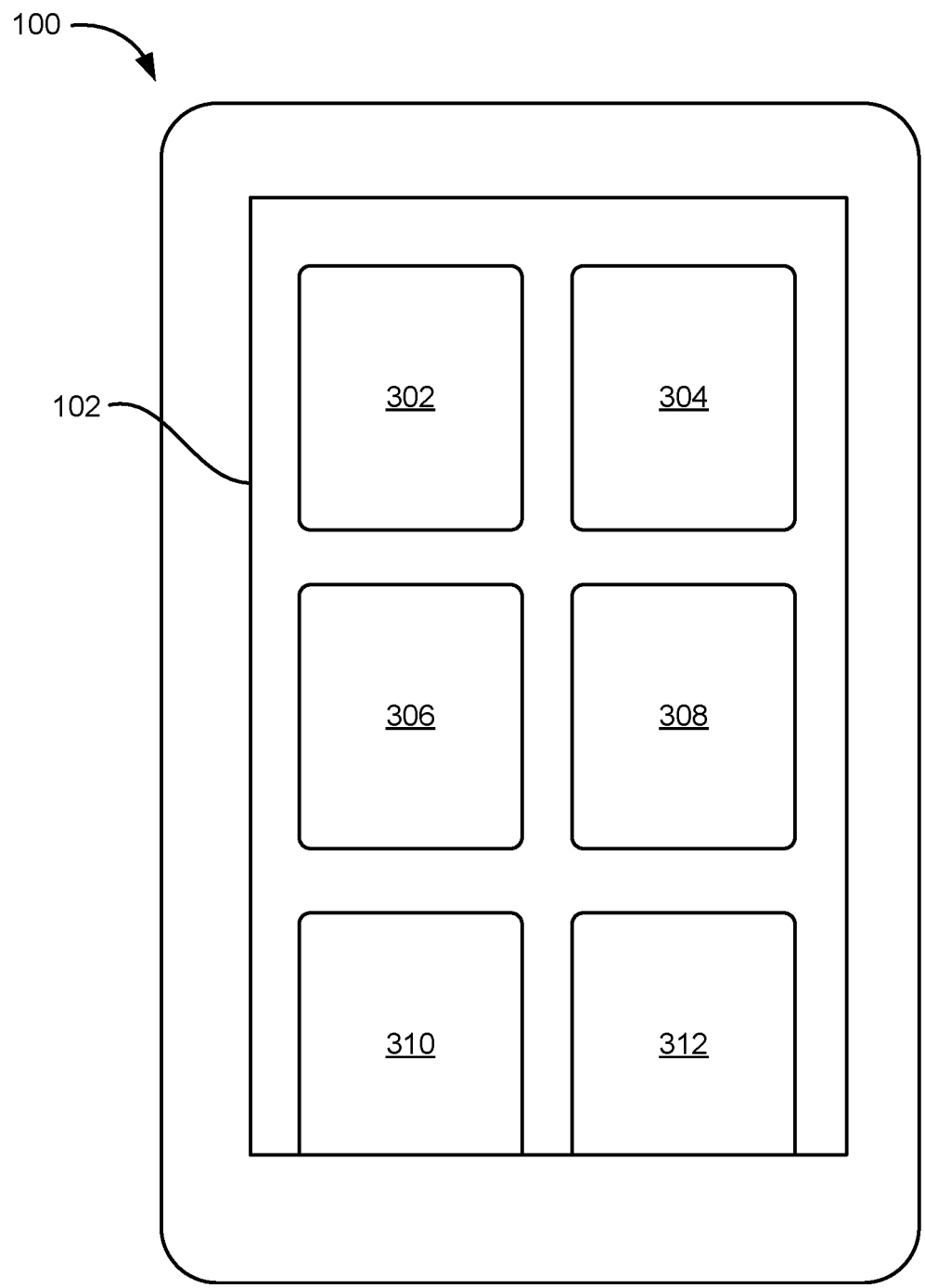
FIG. 3 shows the mobile computing device with the display presenting reduced images of webpages that are included in a tab group.

In some examples, the tab strip 110 can include a thumbnail icon 114 and/or thumbnail indicator. The mobile computing device 100 can respond to a user selecting the thumbnail icon 114, such as by tapping or clicking on the thumbnail icon 114, by presenting reduced images and/or thumbnail images of webpages included in a group. An example of the reduced images and/or thumbnail images is shown in FIG. 3.

In some examples, the tab strip 110 can include an add icon 116 and/or add indicator. The mobile computing device 100 can respond to a user selecting the add icon 116. In some examples, the user can select the add icon 116 by tapping or clicking on the add icon 116. In some examples, the mobile computing device can respond to the user selecting the add icon by adding a website identified by the URL in the URL field 106 (and/or a URL) and/or associated with the webpage presented by the display 102 to the group. The mobile computing device 100 can, for example, add a first website and/or URL, a second website and/or URL, a third website and/or URL, a fourth website and/or URL, or any number of websites and/or URLs to the group in response to the user selecting the add icon 116.

A user can select a webpage for viewing by selecting a page icon 112A, 112B associated with the webpage. The user can select the icon by, for example, tapping or clicking on a page icon 112A, 112B associated with a webpage that the user wishes to view and/or visit.

A technical problem with enabling a user to select a website to visit on a mobile computing device is that the number of tabs, page icons, websites, and/or webpages in a group may be too high to present all of the tabs, page icons, websites, and/or webpages on the tab strip 110 at the same time and/or concurrently. A technical solution to this technical problem that makes all of the page icons associated with websites and/or webpages in the group available for viewing within the limited space on the tab strip 110 is for the mobile computing device 100 to change which page icons associated with the websites and/or webpages are available for viewing in response to user input. The user input could include, for example, a swipe to the left or right on a portion of the display 102 that presents the tab strip 110, clicking a button indicating left or right movement, or selecting directional arrows on an input device.

Figure 1B:
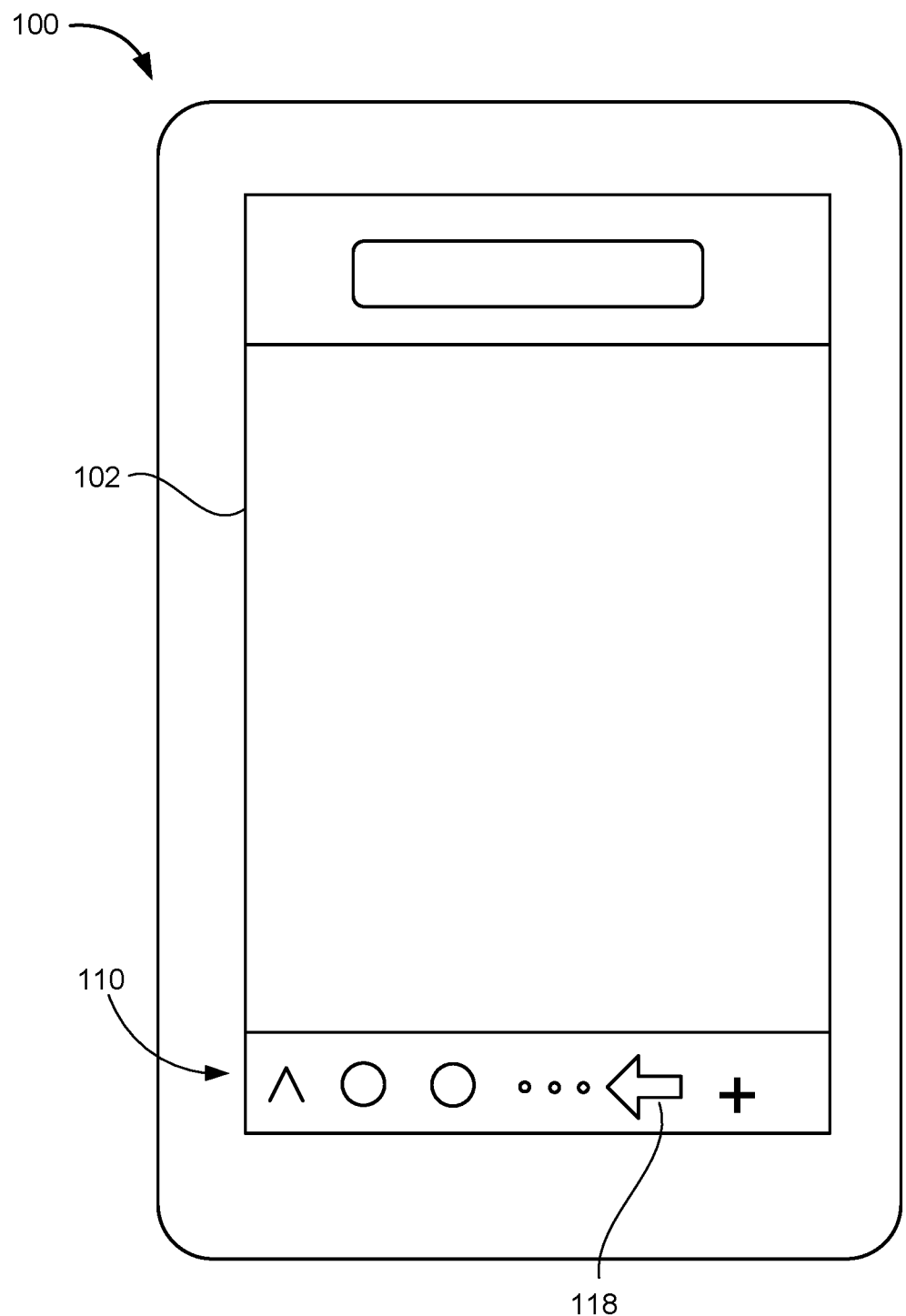
FIG. 1B shows the mobile computing device receiving a swipe input in the tab strip.

FIG. 1B shows the mobile computing device 100 receiving a swipe input 118 in the tab strip 110. In this example, the swipe input 118 is toward the left side of the display 102. The swipe input 118 can be a swipe input into the display 102 in an example in which the display 102 is a touchscreen. The swipe input 118 is an example of directional input, which could also include clicking a button indicating a direction such as left or right. The mobile computing device 100 can respond to the swipe input 118 and/or directional input by modifying the presentation of the page icons 112A, 112B, such as moving the page icons 112A, 112B in a direction corresponding to the direction of the directional input. In this example in which the directional input is a leftward swipe input, the mobile computing device 100 can modify the presentation of the page icons 112A, 112B by moving the page icons 112A, 112B to the left.

Figure 1C:
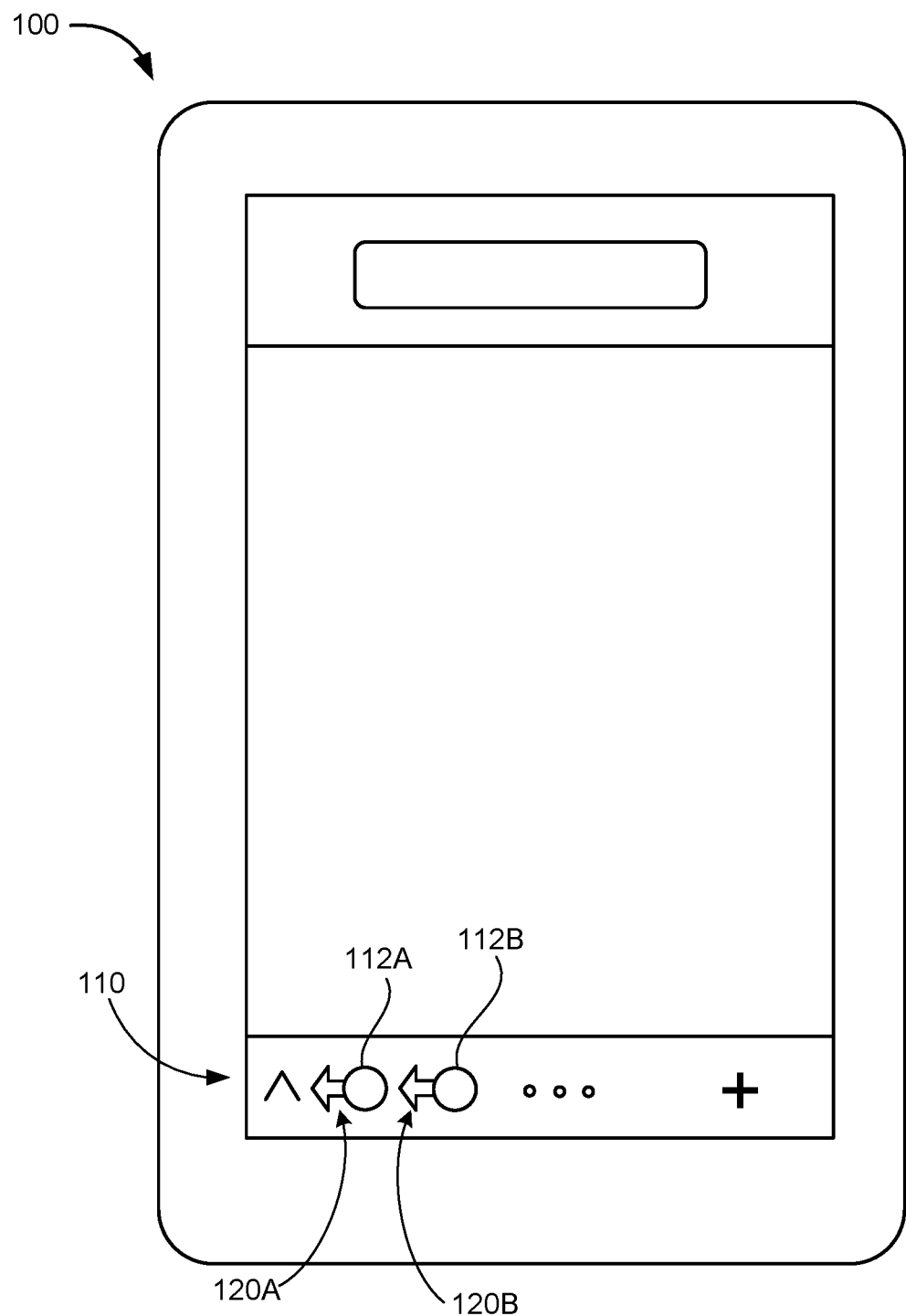
FIG. 1C shows page icons included in the tab strip moving in response to the swipe input.

FIG. 1C shows page icons 112A, 112B included in the tab strip 110 moving in response to the swipe input 118. The movement 120A, 120B of the page icons 112A, 112B is in a same direction as the directional input, such as the swipe input 118 shown in FIG. 1B, and/or in a direction corresponding to the directional input. The mobile computing device 100 can translate the directional input into a predetermined direction, such as translating any directional input such as movements within forty-five degrees (45°) of horizontal into a horizontal input (either left or right). The mobile computing device 100 responds to the directional input by modifying the presentation of the page icons 112A, 112B, such as by sequentially presenting the icons in locations in the direction (such as left) from where the page icons 112A, 112B were previously presented.

Figure 1D:
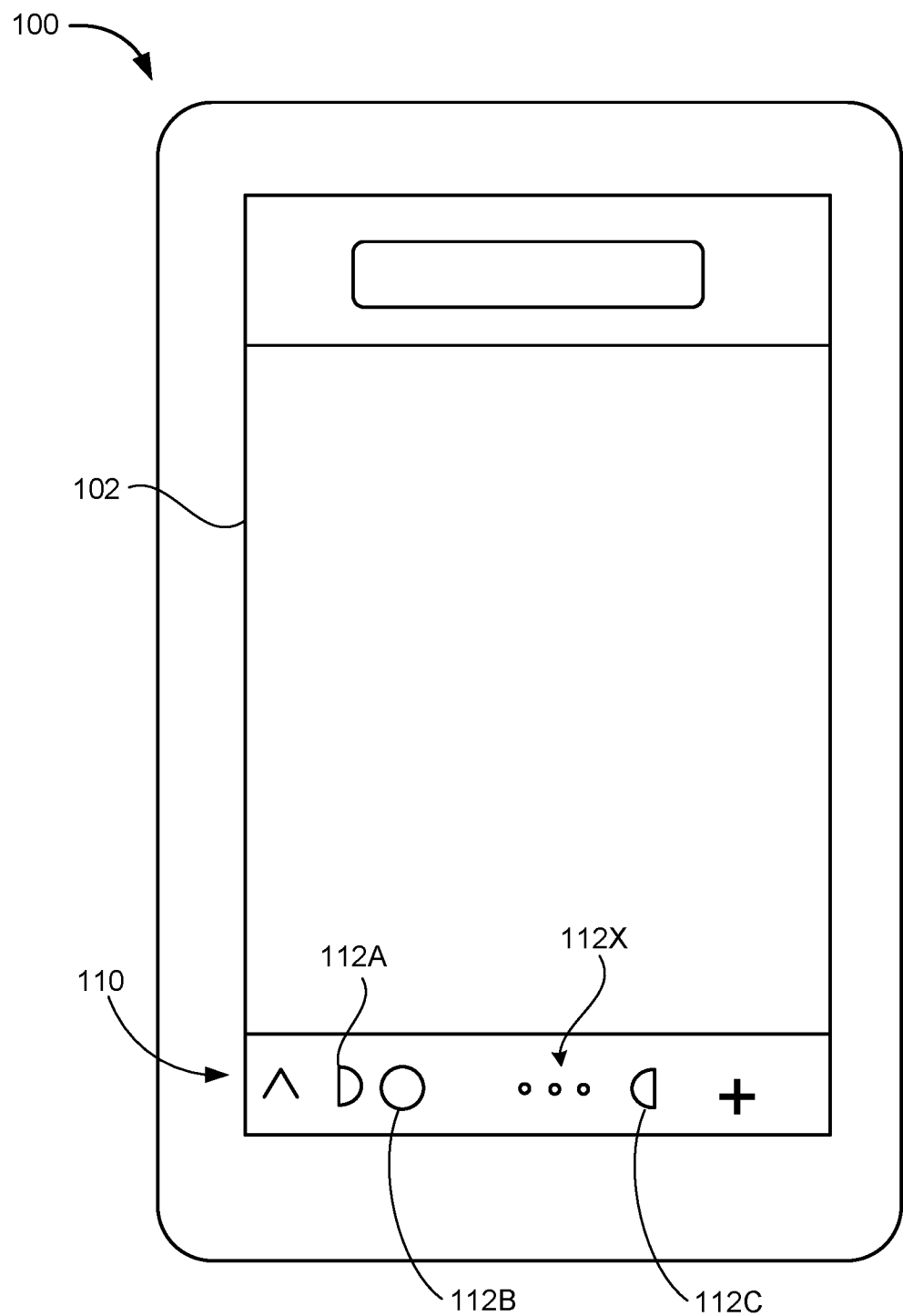
FIG. 1D shows some of the page icons included in the tab strip displayed only partially.

FIG. 1D shows some of the page icons 112A, 112C included in the tab strip 110 displayed only partially. The mobile computing device 100 can partially present the page icons 112A, 112C in response to the directional input such as the swipe input 118. The mobile computing device 100 can partially present the page icons 112A, 112B as part of moving the page icons 112A, 112B across the tab strip 110 presented by the display 102, and/or as part of ending presentation of a page icon such as the first page icon 112A and initiating presentation of a new page icon such as the third page icon 112C. In this example, the mobile computing device 100 has initiated presentation of a third page icon 112C, which can represent and/or be associated with a third website, on the tab strip 110 of the display 102. The mobile computing device 100 can decrease a proportion of the first page icon 112A presented by the display 102 as the mobile computing device 100 moves the presentation of the page icons 112A, 112B, 112C leftward, until no portion of the first page icon 112A is displayed, and/or can initiate presentation of the third page icon 112C by increasing a proportion of the third page icon 112A presented by the display 102 as the computing device 100 moves the presentation of the page icons 112A, 112B, 112C leftward, from presenting none of the third page icon 112C to presenting the third page icon 112C in full. In this example, the first page icon 112A has moved to a leftward limit of the tab strip 110, and is displayed only partially.

Figure 1E:
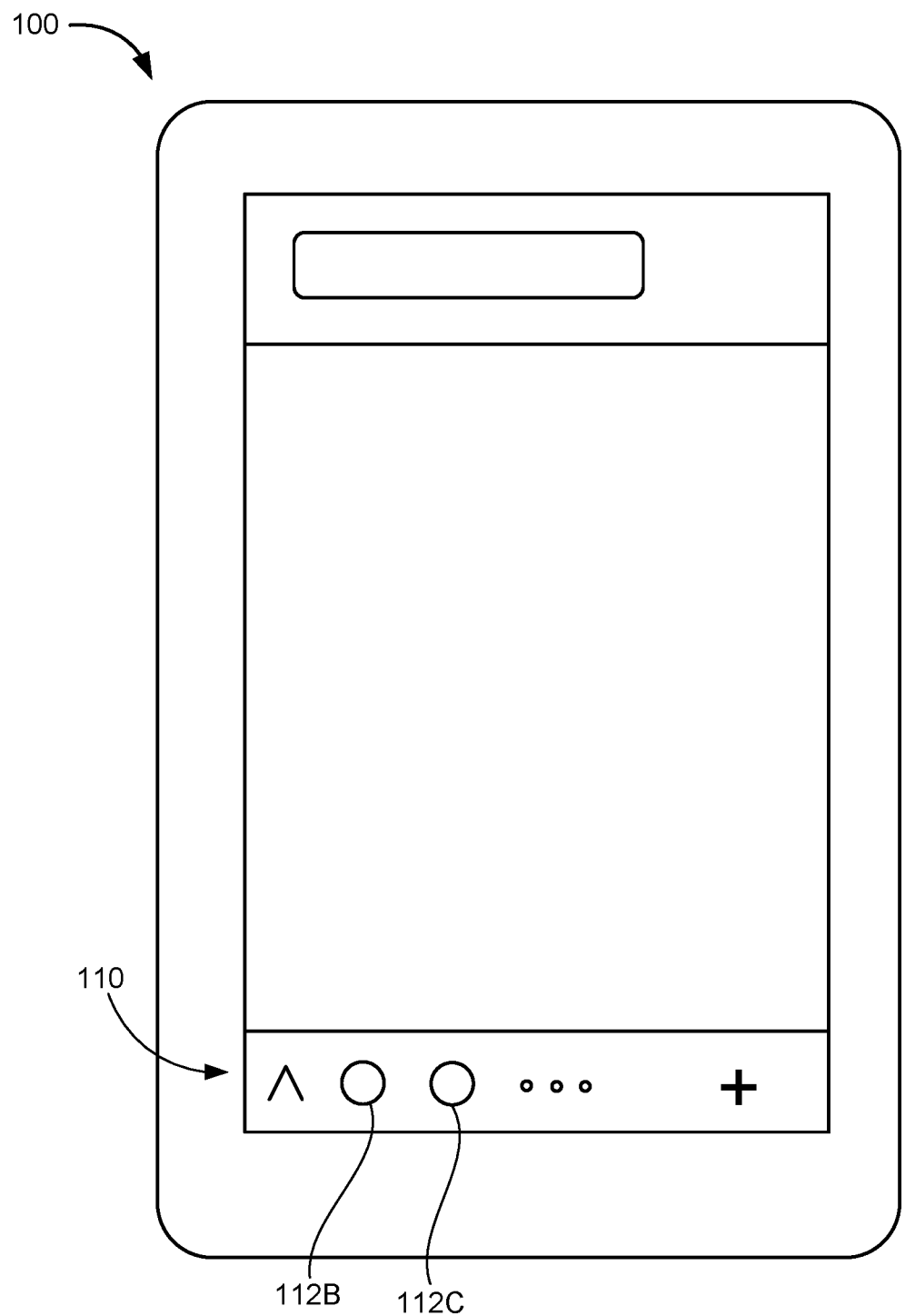
FIG. 1E shows the mobile computing device and the tab strip with at least one page icon presented that was not presented in FIG. 1A and at least one page icon that was presented in FIG. 1A not presented in FIG. 1E.

FIG. 1E shows the mobile computing device 100 and the tab strip 110 with at least one page icon 112C presented that was not presented in FIG. 1A and at least one page icon 112A that was presented in FIG. 1A not presented in FIG. 1E. The second page icon 112B is presented in both FIG. 1A and FIG. 1E. In this example, after partially displaying and/or presenting the first page icon 112A and the third page icon 112C, as shown and described with respect to FIG. 1D, the mobile computing device 100 has modified the presentation of the tab strip 110 by ending presentation of the first page icon 112A (not shown in FIG. 1E) and fully presenting the third page icon 112C.

A user can also provide directional input in an opposite direction, such as swiping right. The mobile computing device 100 can respond to receiving and/or interpreting the directional input int the opposite direction by moving the page icons 112A, 112B, 112C in the opposite direction, such as to the right. The moving and/or changing presentation of the page icons 112A, 112B, 112C can, in some examples, end or terminate presentation of the third icon and initiate presentation, and/or represent, the first icon 112A, returning the presentation of the tab strip 110 to the presentation shown in FIG. 1A.

Figure 1F:
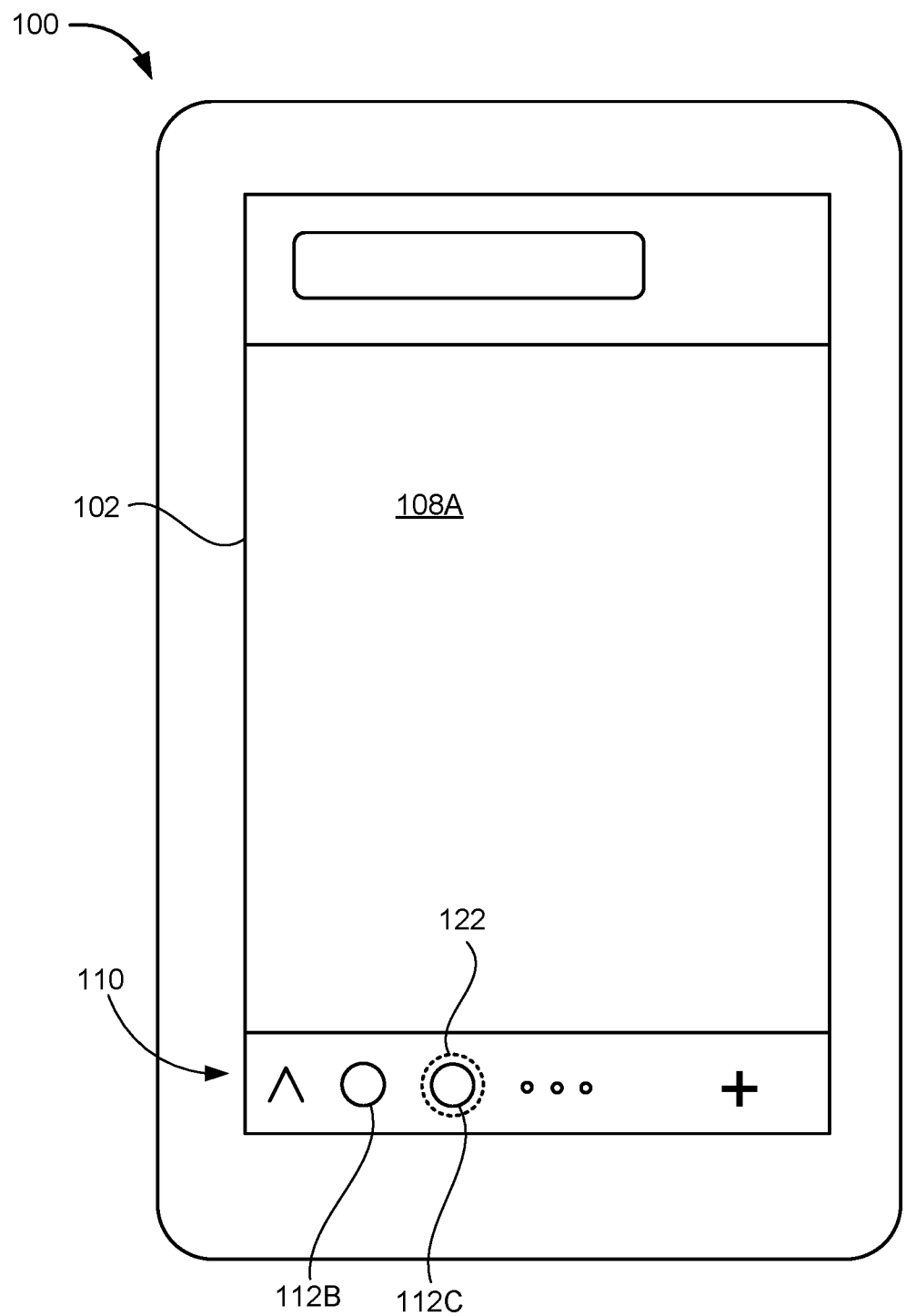
FIG. 1F shows a selection of one of the page icons included in the tab strip.

FIG. 1F shows a selection 122 of one of the page icons 112C included in the tab strip 110. After modifying the presentation in response to directional input from the user, the mobile computing device 100 can receive a selection 122 of the third icon 112C. In some examples, the selected third icon 112C was not presented by the mobile computing device 100 before the directional input 118, and was presented by the mobile computing device 100 only after the directional input 118. In some examples, the selection 122 can include a tap or a swipe in the area of the display 102 where the selected, third icon 112C is presented.

Figure 1G:
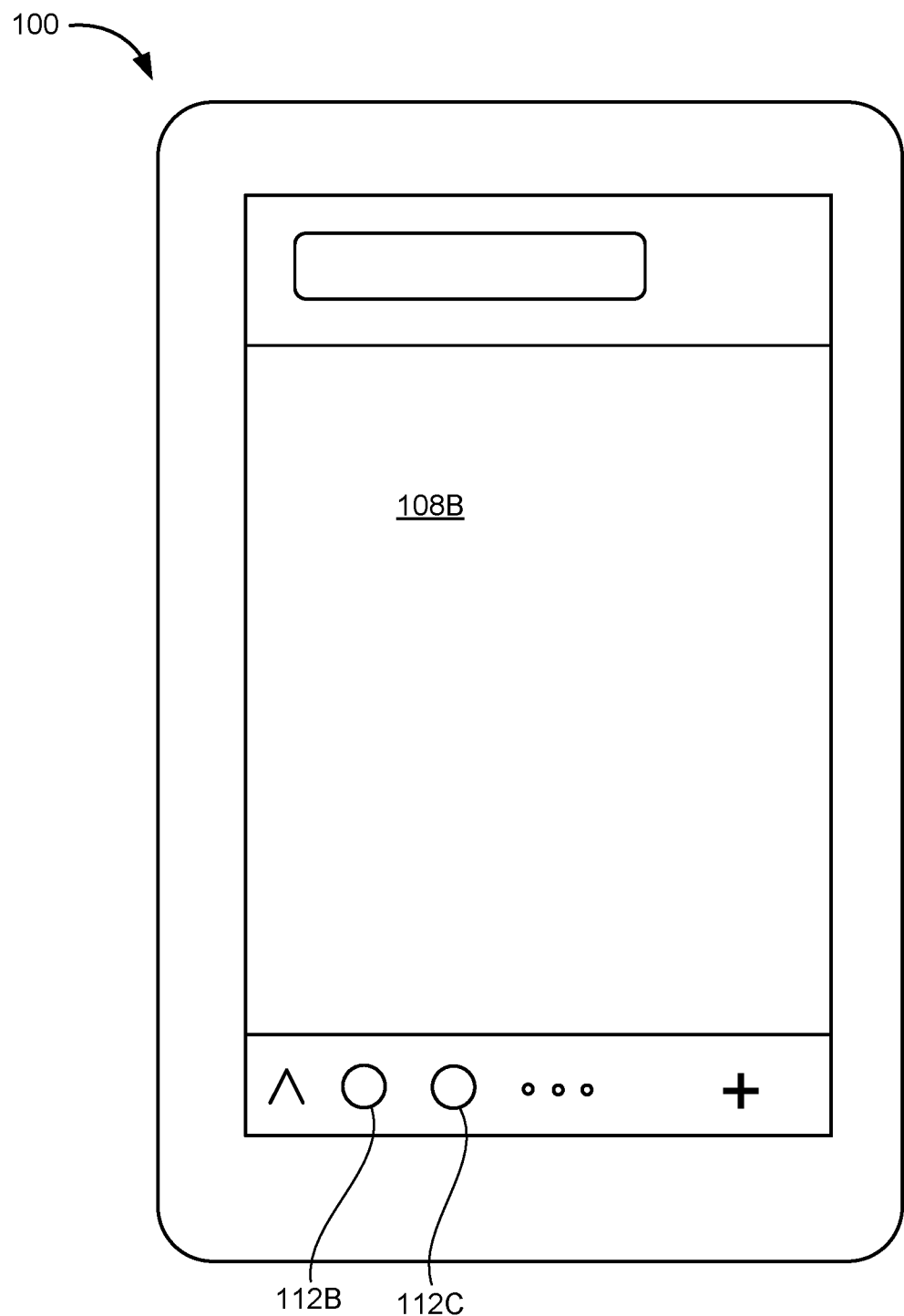
FIG. 1G shows the mobile computing device with the display presenting a second webpage and the tab strip.

FIG. 1G shows the mobile computing device 100 with the display 112 presenting a second webpage 108B and the tab strip 110. The second webpage 108B can be associated with the third page icon 112C. The mobile computing device 100 can present the second webpage 108B in response to the user's selection 122 of the third page icon 112C. The mobile computing device 100 can present the second webpage 108B by sending a request to the website associated with the third page icon 112C, receiving HTML code from the website associated with the third page icon 112C, rendering the HTML code received from the website associated with the third page icon 112C, and generating and/or presenting the second webpage 108B based on the rendered HTML code.

In some examples, the sequence of events shown in FIGS. 1A through 1G can be described as follows. The mobile computing device 100 can present, within the display 102 of the mobile computing device 100, the first webpage 108A and the tab strip 110. The first webpage 108A can be associated with a first URL. The mobile computing device 100 can present the first URL in a URL field 106 within the display 102. The tab strip 110 can include a first page icon 112A associated with the first webpage 108A, a second page icon 112B associated with another webpage, and any number of other page icons represented by the ellipses 112X. The tab strip 110 can also include a thumbnail icon 114 for prompting the mobile computing device 100 to present thumbnail images and/or reduced images of webpages in a group, as shown in FIG. 3, and/or an add icon 116 for adding webpages to the group.

The user can provide directional input, such as a horizontal swipe input 118, into and/or associated with the tab strip 110. The mobile computing device 100 can respond to the directional input by modifying the presentation of the tab strip 110. The modification of the presentation of the tab strip 110 can include moving the page icons 112A, 112B in a direction corresponding to the directional input (such as presenting the page icons 112A, 112B moving in a same direction as the swipe), ending presentation of the first page icon 112A, and/or initiating prestation of a third page icon 112C. The third page icon 112C can be associated with a third URL.

The mobile computing device 100 can receive a selection 122 of the third page icon 112C. The selection 122 of the third page icon 112C can include a contact such as a tap on an area of the display 102 that presents the third icon 112C, or a selection of the third icon 112C with a cursor, as non-limiting examples. The mobile computing device 100 can respond to the selection 122 of the third page icon 112C by presenting a second webpage 108B that is associated with the third page icon 112C. The mobile computing device 100 can present the second webpage 108B by sending a request to a third website associated with the third page icon 112C, receiving HTML code from the third website, rendering the HTML code, and presenting the second webpage 108B based on the rendered HTML code.

Figure 2:
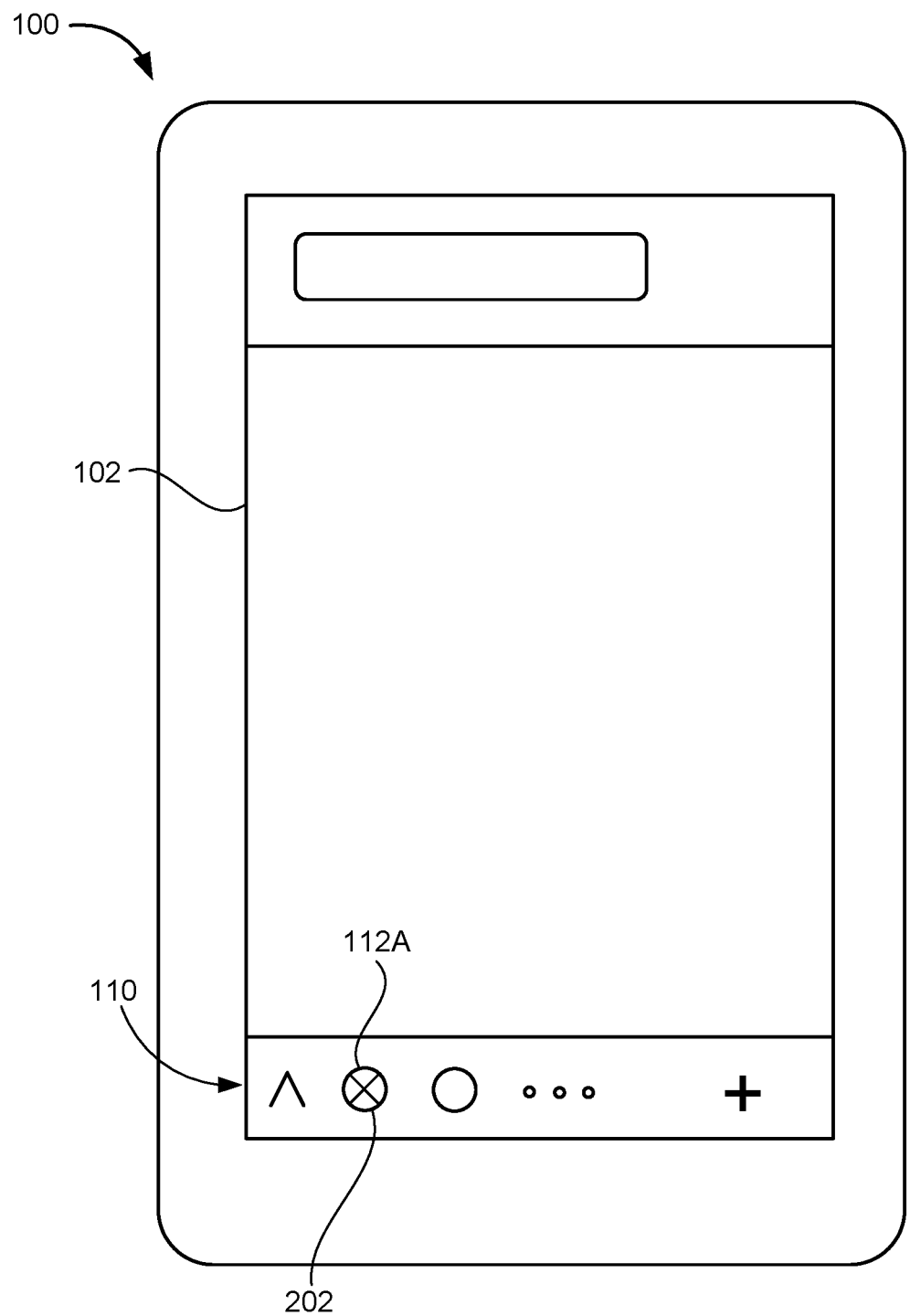
FIG. 2 shows the mobile computing device with one of the page icons including an indication that the page icon can be selected for deletion.

FIG. 2 shows the mobile computing device with one of the icons 112A including an indication 202 that the icon 112A can be selected for deletion. Users may desire to remove and/or delete icons from a group. The mobile computing device 100 can delete and/or remove an icon, such as the first page icon 112A, and/or the associated webpage and/or website, from a group in response to user input instructing the mobile computing device 100 to remove the icon 112A from the group. In some examples, the mobile computing device 100 can add the indication 202 that the icon 112A can be selected for deletion in response to user input. In some examples, the user input, to which the mobile computing device 100 responds by adding the indication 202, can be the user pressing and holding, rather than tapping (which can indicate the selection 122), on an area of the display 102 that presents the page icon 112A that the user wants to delete. The mobile computing device 100 can respond to the user input by adding an indication, such as an 'X', to the page icon 112A that is available for deletion. The mobile computing device 100 can respond to further user input, such as a tap on the portion of the display that presents the icon 112A and/or indication 202, by removing and/or deleting the icon 112A from the group.

FIG. 3 shows the mobile computing device 100 with the display 102 presenting reduced images of webpages and/or reduced versions of webpages that are included in a tab group. The mobile computing device 100 can present the reduced images and/or reduced versions of the webpages in response to the user selecting the thumbnail icon 114. The reduced images can be reduced webpages 302, 304, 306, 308, 310, 312 and/or thumbnail webpages. The reduced webpages 302, 304, 306, 308, 310, 312 can include reduced and/or scaled-down versions of the webpages 108A, 108B shown and described above, and/or other webpages included in the group. The user can scroll through the reduced webpages 302, 304, 306, 308, 310, 312, such as by providing up or down input to the mobile computing device 100, prompting the mobile computing device 100 to respond to the directional input by moving the reduced webpages 302, 304, 306, 308, 310, 312 in a direction based on the directional input, and/or ceasing presenting one or more of the reduced webpages 302, 304, 306, 308, 310, 312 and initiating presenting one or more additional reduced webpages in the group. The user can select one of the reduced webpages 302, 304, 306, 308, 310, 312, such as by tapping on a portion of the display 102 that presents the selected reduced webpage 302, 304, 306, 308, 310, 312. The mobile computing device 100 can respond to the selection of one of the reduced webpages 302, 304, 306, 308, 310, 312 by presenting a full version of the selected reduced webpage 302, 304, 306, 308, 310, 312 in the display 102, such as a full presentation shown in FIG. 1A.

Figure 4:
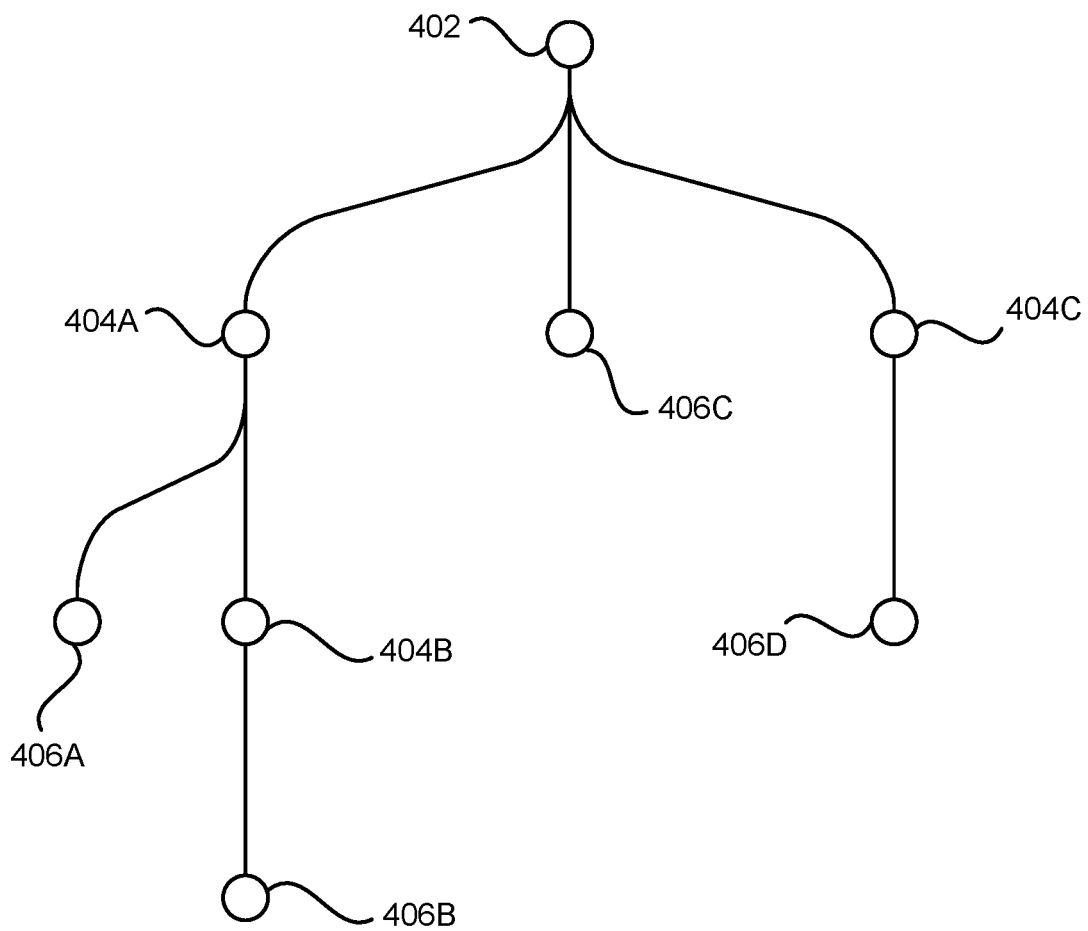
FIG. 4 shows a navigation tree of websites.

FIG. 4 shows a navigation tree 400 of websites. The mobile computing device 100 can add websites and/or webpages to a group automatically, and/or without user instruction to add a website and/or webpage to the group. The mobile computing device 100 can add websites and/or webpages to a group automatically, and/or without user instruction, in response to the user's navigation through websites and/or groups.

The navigation tree 400 shows nodes 402, 404A, 404B, 404C, 406A, 406B, 406C, 406D representing websites that a user has visited via the mobile computing device 100 during a web browsing session. A root node 402 represents a first website that a user visits during the web browsing session. The user navigates to leaf nodes 406A, 406B, 406C, 406D via intermediate nodes 404A, 404B, 404C. The leaf nodes 406A, 406B, 406, 406D can represent websites that a user visits before typing a new URL into the URL field 106, before clicking a back button on a web browser, that a user stays at for a predetermined and/or threshold amount of time, and/or from which a webpage is rendered that a user interacts with. The mobile computing device 100, and/or another computing device in communication with the mobile computing device 100, can add websites represented by leaf nodes to a group for the user to navigate to via the tab strip 110.

In some examples, the mobile computing device 100 can create groups and/or subgroups of websites based on navigation patterns. In some examples, the mobile computing device 100 can create groups and/or subgroups of leaf nodes that share an intermediate node. For example, the mobile computing device 100 can create a group and/or subgroup with websites represented by leaf nodes 406A, 406B based on the leaf nodes 406A, 406B sharing intermediate node 404A.

In some examples, a server in communication with the mobile computing device 100 can instruct the mobile computing device 100 to create one or more groups of websites based on navigation patterns of other users to websites that a user of the mobile computing device 100 has visited. For example, if the user of the mobile computing device 100 has visited websites represented by leaf nodes 406A, 406B, 406C, 406D, and the server has determined that navigation patterns of other users match a similarity threshold to the pattern shown in FIG. 4, then the server can instruct the mobile computing device 100 to create a group that includes websites represented by leaf nodes 406A, 406B, 406C, 406D.

Figure 5:
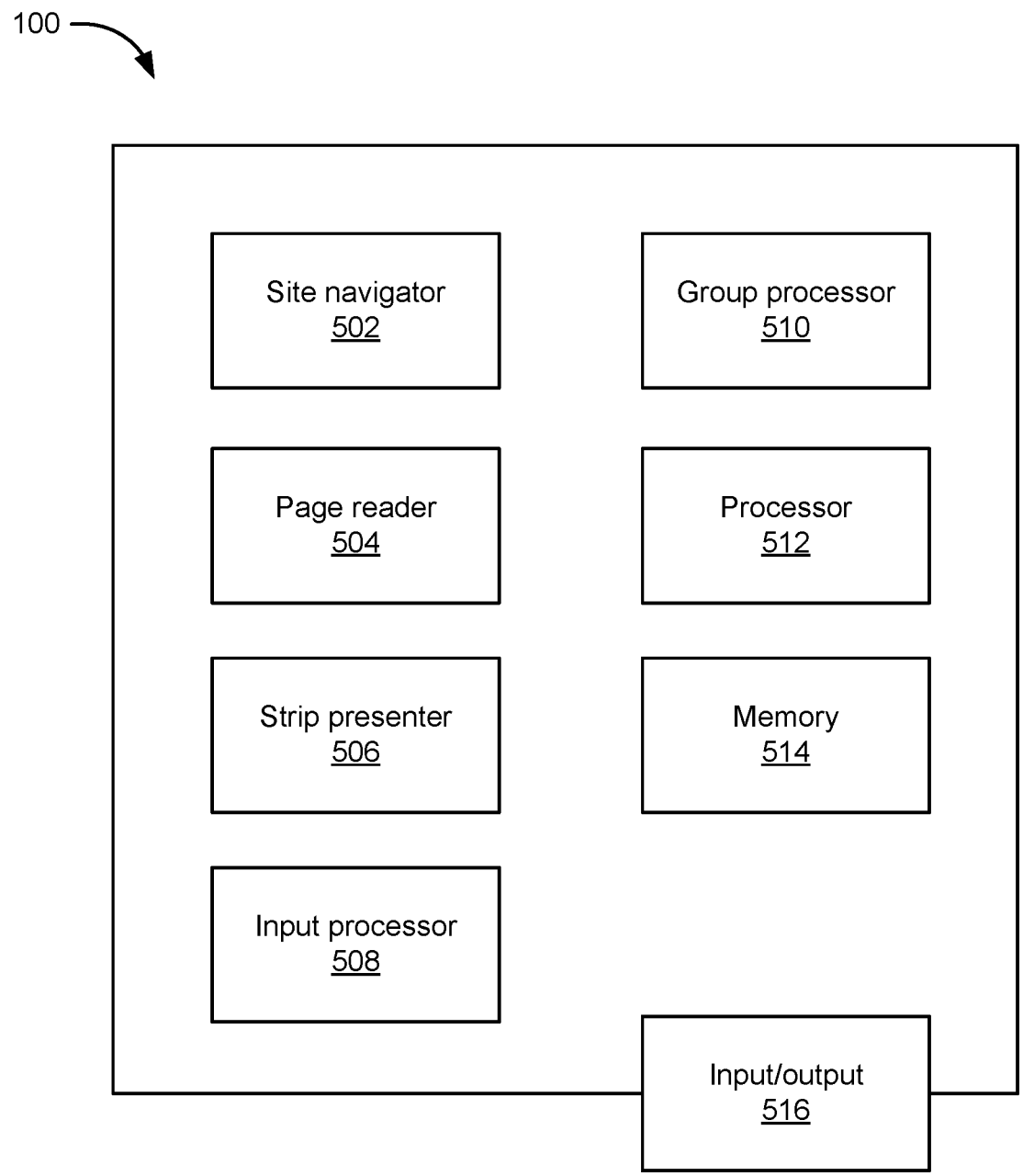
FIG. 5 is a schematic view of the mobile computing device.

FIG. 5 is a schematic view of the mobile computing device 100. The mobile computing device 100 can perform any combination of methods, functions, and/or techniques described herein.

The mobile computing device 100 can include a site navigator 502. The site navigator 502 can navigate to various websites by sending page requests to websites selected by the user of the mobile computing device 100. The user can select the websites by entering URLs associated with the websites into the URL field 106, by selecting page icons 112A, 112B, 112C, or clicking on hyperlinks included in webpages 108A, 108B, as non-limiting examples.

The mobile computing device 100 can include a page renderer 504. The page renderer 504 can render webpages 108A, 108B for presentation by the display 102. The page renderer 504 can render the webpages 108A, 108B based on code, such as HTML, code, received by the mobile computing device 100 from websites to which the site navigator 502 sends page requests.

The mobile computing device 100 can include a strip presenter 506. The strip presenter 506 can generate and/or present, on the display 102, the tab strip 110. The strip presenter 506 can generate and/or present the tab strip 110 with icons 112A, 112B, 112C within the tab strip 110 representing webpages and/or websites included in the group. In some examples, the strip presenter 506 can generate and/or present the thumbnail icon 114 within the tab strip 110. In some examples, the strip presenter 506 can generate and/or present the add icon 116 within the tab strip 110.

The mobile computing device 100 can include an input processor 508. The input processor 508 can process, and/or interpret, user inputs, and prompt responses based on the user inputs. The input processor 508 can process and/or interpret, for example, taps and/or clicks on page icons 112A, 112B, 112C, the thumbnail icon 114, the add icon 116, and/or hyperlinks presented by the webpages 108A, 108B, and/or text entered into the URL field 106.

The input processor 508 can prompt responses to the processed and/or interpreted input. In some examples, the input processor 508 can prompt the site navigator 502 to navigate to a website based on input into any of the page icons 112A, 112B, 112C or into the URL field 106. In some examples, the input processor 508 can prompt the page renderer 504 to present thumbnail and/or reduced images 302, 304, 306, 308, 310, 312 of webpages within the group in response to selection of the thumbnail icon 114. In some examples, the input processor 508 can prompt a group processor 510 to add a website and/or webpage to a group based on user selection of the add icon 116.

The mobile computing device 100 can include a group processor 510. The group processor 510 can maintain websites in a group, add websites to the group, and/or remove or delete websites from the group. In some examples, the group processor 510 can add a website associated with a webpage 108A, 108B presented by the display 102 to the group in response to selection of the add icon 116. In some examples, the group processor 510 can remove and/or delete a website associated with a webpage 108A, 108B presented by the display 102 from the group in response to the user selecting a page icon 112A for which the display 102 presents an indication 202 that the icon 112A can be selected for deletion.

In some examples, the mobile computing device 100 can close groups automatically, and/or without user instruction to close the group. In some examples, the mobile computing device 100 can close a group based on the user not visiting any of the websites in the group, and/or based on the user not selecting any of the page icons that represent web sites included in the group, for a threshold period of time and/or after visiting a threshold number of other websites not included in the group.

In some examples, the group processor 510 can create and/or add URLs to a group, and/or create a new group, based on suggestions from a server in communication with the mobile computing device 100. The group processor 510 can, for example, send a request to the server and/or call an application program interface (API) for URLs to add to the group and/or to create the new group.

In some examples, the request and/or API call can include web and/or Internet browsing patterns on the computing device 100 within a predetermined time period and/or inputs to the tab strip 110 within a predetermined time period. The group processor 510 can create a new group with the URLs included in a suggestion message received from the server, and/or add URLs included in a suggestion message to an existing group.

In some examples, the group processor 510 can suggest closing and/or removing a URL from a group based on a determination that the user is unlikely to re-visit the website(s) indicated by the URL(s). In some examples, the group processor 510 can respond to a previous "opt in" input and/or instruction from the user to automatically close and/or remove URLs by closing and/or removing a URL from a group automatically and/or without user intervention, based on a determination that the user is unlikely to re-visit the website(s) indicated by the URL(s).

In some examples, the group processor 510 can determine that the user is unlikely to re-visit the website(s) indicated by the URL(s) based on a threshold period of time passing without receiving a request to visit the website. In some examples, the group processor 510 can determine that the user is unlikely to re-visit the website(s) indicated by the URL(s) based on a threshold period of time passing without receiving a request to visit the website or websites with similar content as the website for which the URL will be closed and/or removed from the group. In some examples, the group processor 510 can determine that the user is unlikely to re-visit the website(s) indicated by the URL(s) based on a threshold period of time passing without receiving inputs to pages rendered based on the website or websites with similar content as the website for which the URL will be closed and/or removed from the group. In some examples, the group processor 510 can determine that the user is unlikely to re-visit the website(s) indicated by the URL(s) based on a number of URLs in the group exceeding a maximum number of URLs for the group and the URL being the least-recently visited URL for the group. In some examples, the group processor 510 can receive a save instruction associated with a URL and a group. Based on the save instruction associated with the URL and the group, the group processor 510 can keep (e.g. maintain) the URL in the group despite a determination that the user is unlikely to visit the website indicated by the URL.

In some examples, the group processor 510 can create a group with multiple URLs based on the user indicating interest in a subject that is common to the URLs to be added to the group. The group processor 510 can determine that the user has indicated interest in the subject based, for example, on search queries received from the user and/or based on the user visiting multiple websites that are associated with the subject.

In some examples, the group processor 510 can share a group with other users, accounts, and/or devices. The group processor 510 can share the group by, for example, sending a group message to another account(s) and/or device(s). The group processor 510 can send the group message to another account(s) and/or device(s) via an intermediate server, such as via the Internet. In some examples, the group message can include a list of URLs to be included in a group and an indicator that the URLs should be included in the group. The group processor 510 can share the group in response to user input instructing the mobile computing device 100 to share the group. The group message can prompt other users to visit websites represented by URLs included in the shared group.

In some examples, the group processor 510 can aggregate inputs to multiple websites. The group processor 510 can, for example, aggregate inputs to multiple websites and provide an aggregated graphical user interface (GUI) presenting the aggregated inputs. In some examples, the group processor 510 can aggregate shopping carts from multiple websites in which the mobile computing device 100 has received input from the user to add items to a cart, and present a single aggregated GUI presenting the items for which the mobile computing device 100 received input to add to the cart. The mobile computing device 100 can, in response to receiving input from the user, such as input to check out, provide a checkout input to each of the websites in which the mobile computing device 100 has received input from the user to add items to a cart. An example of an aggregated GUI is shown in FIG. 6.

Figure 6:
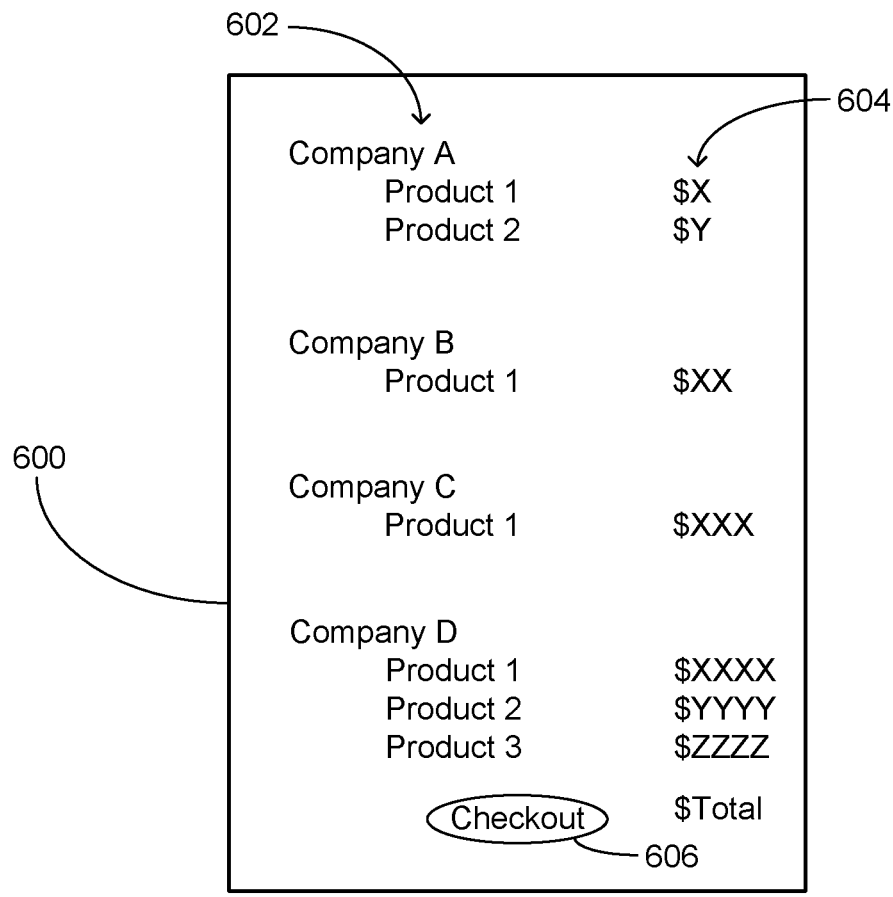
FIG. 6 shows an aggregated graphical user interface (GUI).

FIG. 6 shows an aggregated GUI 600. The aggregated GUI 600 can present multiple products 602 and/or items from multiple websites in which the mobile computing device 100 has received input from the user to add items to a cart. The aggregated GUI 600 can separate the products 602 by website and/or company for which the mobile computing device 100 has received input from the user to add items to the cart. The aggregated GUI 600 can present prices 604 for each of the items, and/or a total price for the items. The aggregated GUI 600 can present a checkout button 606. The mobile computing device 100 can respond to input to the checkout button 606, such as a tap or click on the checkout button 606, by providing checkout input to each of the websites in which the mobile computing device 100 has received input from the user to add items 602 to the cart.

Returning to FIG. 5, in some examples, the group processor 510 can create and/or add URLs to a group, and/or create a new group, based on suggestions from a server in communication with the mobile computing device 100, and can suggest closing and/or removing a URL from a group based on a determination that the user is unlikely to re-visit the website(s) indicated by the URL(s). In some examples, group processor 510 can create and/or add URLs to a group, and/or create a new group, based on suggestions from a server in communication with the mobile computing device 100, and can create a group with multiple URLs based on the user indicating interest in a subject that is common to the URLs to be added to the group. In some examples, the group processor 510 can create and/or add URLs to a group, and/or create a new group, based on suggestions from a server in communication with the mobile computing device 100, can suggest closing and/or removing a URL from a group based on a determination that the user is unlikely to re-visit the website(s) indicated by the URL(s), and can create a group with multiple URLs based on the user indicating interest in a subject that is common to the URLs to be added to the group.

In some examples, the group processor 510 can, via communication with a server, maintain and/or continue a group via multiple computing devices. For example, the group processor 510 can create and/or update a group while the user is interacting with the mobile computing device 100, and notify a server that maintains an account associated with the user of one or more groups and/or the URLs included in the groups. When the user accesses a different computing device in association with his or her account, the different computing device can recognize and/or present the group(s) in a similar manner to the methods, techniques, and/or functions described herein with respect to the mobile computing device 100.

The mobile computing device 100 can include at least one processor 512. The at least one processor 512 can execute instructions, such as instructions stored in at least one memory device 514, to cause the mobile computing device 100 to perform any combination of methods, functions, and/or techniques described herein.

The mobile computing device 100 may include at least one memory device 514. The at least one memory device 514 can include a non-transitory computer-readable storage medium. The at least one memory device 514 can store data, HTML code for rendering webpages, and/or URLs of websites included in groups. The at least one memory device 514 can also store instructions thereon that, when executed by at least one processor, are configured to cause the mobile computing device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the mobile computing device 100 can be configured to perform, alone, or in combination with the mobile computing device 100, any combination of methods, functions, and/or techniques described herein.

The mobile computing device 100 may include at least one input/output node 516. The at least one input/output node 516 may receive and/or send data, such as from and/or to, a server, and/or may receive input and provide output from and to a user. The input and output functions may be combined into a single node, or may be divided into separate input and output nodes. The input/output node 516 can include, for example, a touchscreen display 102, a speaker, a microphone, one or more buttons, and/or one or more wired or wireless interfaces for communicating with other computing devices.

Figure 7:
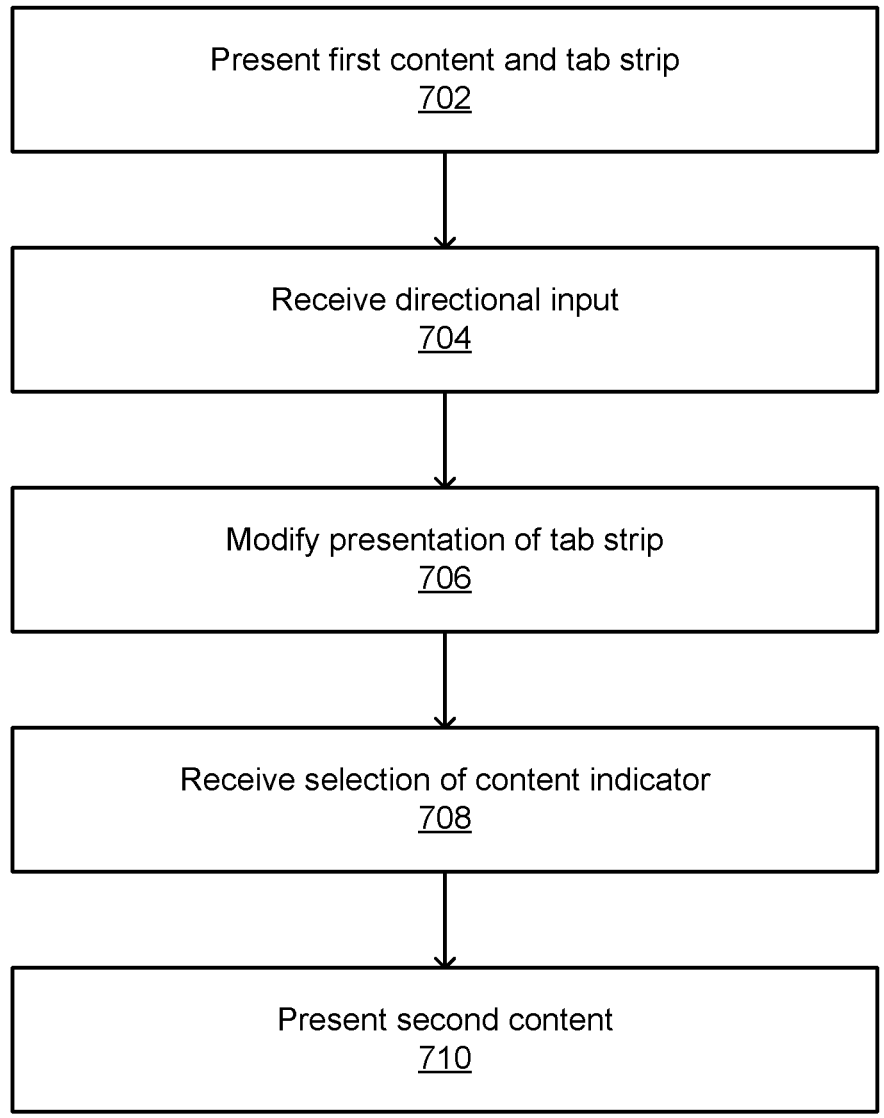
FIG. 7 is a flowchart showing a method performed by the mobile computing device.

FIG. 7 is a flowchart showing a method performed by the mobile computing device 100. The method can include presenting, within a display of the mobile computing device, first network-associated content and a tab strip, the first network-associated content being associated with a first content locator, the tab strip including a first content indicator associated with the first content locator and a second content indicator associated with a second content locator (702). The method can include receiving a directional input associated with a portion of the display presenting the tab strip (704). The method can include, in response to receiving the directional input, modifying the presentation of the tab strip, the modification ending presentation of the first content indicator and initiating presentation of a third content indicator, the third content indicator being associated with a third content locator (706). The method can include receiving a selection of the third content indicator (708). The method can include, in response to receiving the selection of the third content indicator, presenting second network-associated content at a location where the first network-associated content was previously presented, the second network-associated content being associated with the third content locator (710).

In some examples, the directional input can comprise a horizontal swipe on the portion of the display presenting the tab strip.

In some examples, the modifying the presentation can further comprise presenting the first content indicator, the second content indicator, and the third content indicator moving across the display in a same direction as the directional input.

In some examples, the selection of the third content indicator can comprise receiving a tap at a portion of the display presenting the third content indicator.

In some examples, the tab strip can further include an add indicator, and the method can further include responding to a selection of the add indicator by adding a fourth content locator to a group, the group including the first content locator, the second content locator, and the third content locator.

In some examples, the tab strip can further include a thumbnail indicator, and the method can further include responding to a selection of the thumbnail indicator by concurrently presenting images of at least the first network-associated content, second network-associated content associated with the second content locator, and the third network-associated content.

In some examples, the first content locator, the second content locator, and the third content locator were manually added to a group by a user.

In some examples, the mobile computing device added at least one of the first content locator, the second content locator, or the third content locator to a group that includes the first content locator, the second content locator, and the third content locator, in response to user navigation through websites.

In some examples, the first content indicator includes a reduced version of an image included in the first network-associated content.

In some examples, the method can further include presenting fourth network-associated content in the display, the fourth network-associated content being associated with a fourth content locator, receiving a selection of the fourth network-associated content, and presenting a fourth indicator in the tab strip, the fourth indicator being associated with the fourth content locator.

Figure 8:
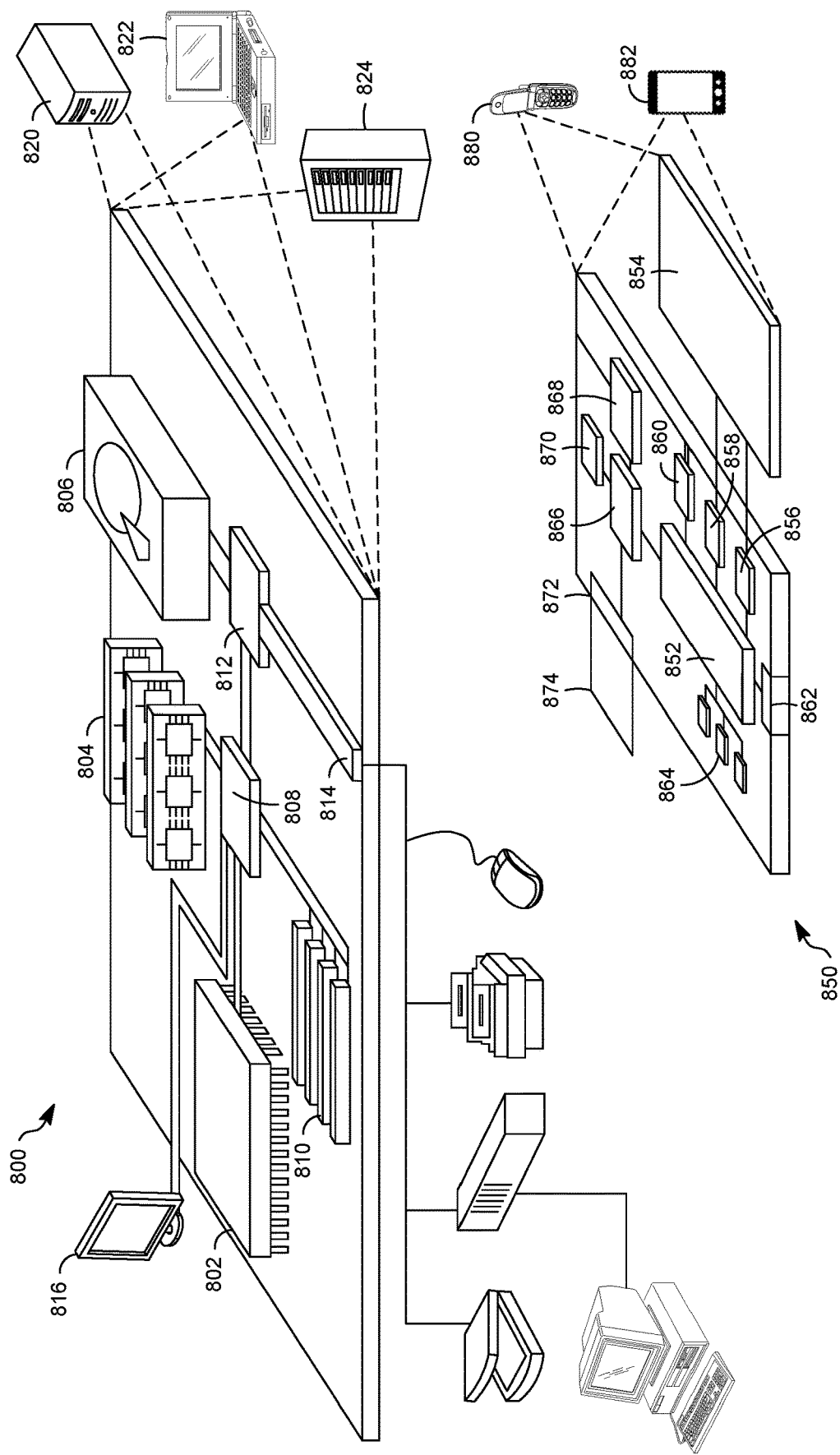
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer-readable storage medium comprising instructions stored thereon that, when executed by at least one processor, are configured to cause a computing device to:
   present, within a display of the computing device, first network-associated content and a tab strip, the first network-associated content being associated with a first content locator, the tab strip including a first circular content indicator associated with the first content locator;
   receive an input associated with a portion of the display presenting the tab strip;
   in response to receiving the input, modify the presentation of the tab strip, the modification including:
      decreasing a proportion of the first circular content indicator that is presented by the display;
      initiating presentation of a second circular content indicator associated with a second content locator, the initiating presentation of the second circular content indicator including increasing a proportion of the second circular content indicator that is presented by the display;
      ending presentation of the first circular content indicator; and
      presenting the second circular content indicator in full;
   receive a selection of the second circular content indicator; and
   in response to receiving the selection of the second circular content indicator, present second network-associated content, the second network-associated content being associated with the second content locator.

2. The non-transitory computer-readable storage medium of claim 1, wherein:
   the tab strip further includes an add indicator; and
   the instructions are further configured to cause the computing device to respond to a selection of the add indicator by adding a third content locator to a group, the group including the first content locator, the second content locator, and the third content locator.

3. The non-transitory computer-readable storage medium of claim 1, wherein:
   the tab strip further includes a thumbnail indicator; and
   the instructions are further configured to cause the computing device to respond to a selection of the thumbnail indicator by concurrently presenting images of at least the first network-associated content and the second network-associated content.

4. The non-transitory computer-readable storage medium of claim 1, wherein the computing device added at least one of the first content locator or the second content locator to a group that includes the first content locator and the second content locator, in response to user navigation through websites.

5. The non-transitory computer-readable storage medium of claim 1, wherein the first content locator and the second content locator were manually added to a group by a user.

6. The non-transitory computer-readable storage medium of claim 1, wherein the first circular content indicator includes a reduced version of an image included in the first network-associated content.

7. The non-transitory computer-readable storage medium of claim 1, wherein the instructions are further configured to cause the computing device to:
   present third network-associated content in the display, the third network-associated content being associated with a third content locator;
   receive a selection of the third network-associated content; and
   present a third circular content indicator in the tab strip, the third circular content indicator being associated with the third content locator.

8. The non-transitory computer-readable storage medium of claim 1, wherein the instructions are further configured to cause the computing device to:
   maintain a group including the first content locator and the second content locator; and
   close the group based on a user not selecting any of the first circular content indicator or the second circular content indicator for a threshold period of time.

9. The non-transitory computer-readable storage medium of claim 1, wherein the instructions are further configured to cause the computing device to:
   maintain a group including the first content locator and the second content locator; and
   remove the first content locator from the group based on a user not selecting the first circular content indicator for a threshold period of time.

10. The non-transitory computer-readable storage medium of claim 1, wherein the instructions are further configured to cause the computing device to:
    maintain a group including the first content locator and the second content locator; and
    remove the first content locator from the group based on a user not providing input to the first network-associated content for a threshold period of time.

11. The non-transitory computer-readable storage medium of claim 1, wherein the instructions are further configured to cause the computing device to:
    maintain a group including the first content locator and the second content locator; and
    remove the first content locator from the group based on a number of content locators in the group exceeding a maximum number of content locators for the group and the first content locator being a least-recently visited content locator for the group.

12. The non-transitory computer-readable storage medium of claim 1, wherein the input comprises a horizontal swipe on the portion of the display presenting the tab strip.

13. The non-transitory computer-readable storage medium of claim 1, wherein:
the input is directional input; and
the modifying the presentation further comprises presenting the first circular content indicator and the second circular content indicator moving across the display in a same direction as the directional input.

14. The non-transitory computer-readable storage medium of claim 1, wherein the selection of the second circular content indicator comprises receiving a tap at a portion of the display presenting the second circular content indicator.

15. A computing device comprising:
at least one processor; and
a non-transitory computer-readable storage medium comprising instructions stored thereon that, when executed by at least one processor, are configured to cause the computing device to:
present, within a display of the computing device, first network-associated content and a tab strip, the first network-associated content being associated with a first content locator, the tab strip including a first circular content indicator associated with the first content locator;
receive an input associated with a portion of the display presenting the tab strip;
in response to receiving the input, modify the presentation of the tab strip, the modification including:
decreasing a proportion of the first circular content indicator that is presented by the display;
initiating presentation of a second circular content indicator, the second circular content indicator being associated with a second content locator, the initiating presentation of the second circular content indicator including increasing a proportion of the second circular content indicator that is presented by the display;
ending presentation of the first circular content indicator; and
presenting the second circular content indicator in full;
receive a selection of the second circular content indicator; and
in response to receiving the selection of the second circular content indicator, present second network-associated content, the second network-associated content being associated with the second content locator.

16. The computing device of claim 15, wherein the input comprises a horizontal swipe on the portion of the display presenting the tab strip.

17. The computing device of claim 15, wherein:
the input is directional input; and
the modifying the presentation further comprises presenting the first circular content indicator and the second circular content indicator moving across the display in a same direction as the directional input.

18. The computing device of claim 15, wherein the selection of the second circular content indicator comprises receiving a tap at a portion of the display presenting the second circular content indicator.

19. The computing device of claim 15, wherein:
the tab strip further includes an add indicator; and
the instructions are further configured to cause the computing device to respond to a selection of the add indicator by adding a third content locator to a group, the group including the first content locator, the second content locator, and the third content locator.

20. A method comprising:
presenting, within a display of a computing device, first network-associated content and a tab strip, the first network-associated content being associated with a first content locator, the tab strip including a first circular content indicator associated with the first content locator;
receiving an input associated with a portion of the display presenting the tab strip;
in response to receiving the input, modifying the presentation of the tab strip, the modification including:
decreasing a proportion of the first circular content indicator that is presented by the display;
initiating presentation of a second circular content indicator, the second circular content indicator being associated with a second content locator, the initiating presentation of the second circular content indicator including increasing a proportion of the second circular content indicator that is presented by the display;
ending presentation of the first circular content indicator; and
presenting the second circular content indicator in full;
receiving a selection of the second content indicator; and
in response to receiving the selection of the second circular content indicator, presenting second network-associated content, the second network-associated content being associated with the second content locator.

21. The method of claim 20, wherein the input comprises a horizontal swipe on the portion of the display presenting the tab strip.

22. The method of claim 20, wherein:
the input is directional input; and
the modifying the presentation further comprises presenting the first circular content indicator and the second circular content indicator moving across the display in a same direction as the directional input.

23. The method of claim 20, wherein the selection of the second circular content indicator comprises receiving a tap at a portion of the display presenting the second circular content indicator.

24. The method of claim 20, wherein:
the tab strip further includes an add indicator; and
the method further comprises responding to a selection of the add indicator by adding a third content locator to a group, the group including the first content locator, the second content locator, and the third content locator.

25. A non-transitory computer-readable storage medium comprising instructions stored thereon that, when executed by at least one processor, are configured to cause a computing device to:
present, within a display of the computing device, first network-associated content and a tab strip, the first network-associated content being associated with a first content locator, the tab strip including a first circular content indicator associated with the first content locator and a second circular content indicator associated with a second content locator;
receive a directional input associated with a portion of the display presenting the tab strip;

in response to receiving the directional input, modify the presentation of the tab strip, the modification including:
- decreasing a proportion of the first circular content indicator that is presented by the display while maintaining a same radius of the first circular content indicator;
- initiating presentation of a third circular content indicator, the third circular content indicator being associated with a third content locator, the initiating presentation of the third circular content indicator including increasing a proportion of the third circular content indicator that is presented by the display;
- ending presentation of the first circular content indicator; and
- presenting the third circular content indicator in full;

receive a selection of the third circular content indicator; and in response to receiving the selection of the third circular content indicator, present second network-associated content at a location where the first network-associated content was previously presented, the second network-associated content being associated with the third content locator.

* * * * *